United States Patent [19]

Sneddon et al.

[11] Patent Number: 4,946,713

[45] Date of Patent: Aug. 7, 1990

[54] POLY(ALKENYLPENTABORANE) CERAMIC PRECURSORS

[75] Inventors: Larry G. Sneddon, Havertown; Mario G. L. Mirabelli, Philadelphia, both of Pa.

[73] Assignee: University of Pennsylvania, Philadelphia, Pa.

[21] Appl. No.: 153,995

[22] Filed: Feb. 9, 1988

[51] Int. Cl.$^5$ .................... B05D 3/02; C01B 21/064; C08F 130/06

[52] U.S. Cl. .................................... 427/226; 423/290; 423/291; 423/439; 427/227; 427/341; 427/343; 427/377; 425/436 R; 526/239

[58] Field of Search ............... 427/226, 227, 361, 343, 427/377; 528/294; 526/239; 428/698, 704, 436 R; 423/439, 291, 296

[56] References Cited

PUBLICATIONS

Rice, R. W., *Ceram. Bull.,* 62, 899–892, (1983).
Wynne, K. J., Rice, R. W., *Ann. Rev. Mater. Sci.,* 14, 297–334, (1984).
Walker, B. E., Jr., Rice, R. W., Becher, P. F., Bender, B. A., Coblenz, W. S., *Ceram. Bull.,* 62, 916–923, (1983).
Bender, B. A., Rice R. W., Spann, J. R., *Ceram. Eng. Sci. Proc.,* 6, 1171–1183, (1985).
Narula, C. K., Paine, R. T. Schaeffer, R., *Mat. Res. Soc. Symp. Proc.,* 73, 383–388, (1986).
Narula, C. K., Scheaffer, R., Paine, R. T., Datye, A., Hammetter, W. F., *J. Am. Chem. Soc.,* 109, 5556–5557, (1987).
Presentation of Rees, W. S., Jr., and Seyferth, D., at the 194th National Meeting of the American Chemical Society, Sep. 1987, Paper INOR 446, (*J. Am. Ceram. Soc.,* 71 [4] C-194–C-1986, (1988)).
Paciorek, K. J. L., Harris, D. H., Schmidt-Krone, W., Kratzer, R. H., Technical Report No. 4, 1987, Ultrasystems Defense and Space Inc., Irvine, CA.
Sneddon, L. G., *Pure & Appl. Chem.,* vol. 59, No. 7, 837–846, (1987).
Mirabelli, M. G. L., Sneddon, L. G., *J. Am. Chem. Soc.,* 110, 449–453, (1988).
Bracke, P., et al., "Inorganic Fibers and Composite Materials, A Survey of Recent Developments," Chapter 5, pp. 49–57, (Pergamon Press).
Wood, C., "Boron Carbides as High Temperature Thermoelectrical Materials," AIP Conference Proceedings 140, pp. 362–372, (American Institute of Physics, 1986).
Kodama, G., et al., "Reactions of Pentaborane (9) with Ammonia. Characterization of the Diammoniate of Pentaborane (9)," *J. Amer. Chem. Soc.,* 94:2, 407, (1972).
Fritz, P., et al., "Boron–Nitrogen Compounds. XIV. The Preparation of Vinyldibromoborane and Some of its Reactions with Amines," *Inorg. Chem.,* vol. 3, No. 5, 626–627, (1964).
Lynch, A. T., Sneddon, L. G., *J. Am. Chem. Soc.,* 1987, 109, 5867.

*Primary Examiner*—Janyce Bell
*Attorney, Agent, or Firm*—Woodcock Washburn Kurtz Mackiewicz & Norris

[57] ABSTRACT

Novel poly(alkenylpentaboranes) such as poly-2-vinylpentaborane are useful as precursors to BN or $B_4C$ ceramics. The non-crosslinked poly(alkenylpentaboranes), which are soluble in common inert organic solvents, are prepared heat treatment of corresponding alkenylpentaboranes. The non-crosslinked poly(alkenylpentaboranes) are heated under an inert atmosphere to crosslink them, and the crosslinked products are pyrolyzed to yield $B_4C$. Alternatively, the non-crosslinked poly(alkenylpentaboranes) are heated in the presence of ammonia to yield a nitrogen-containing polymer which, upon pyrolysis, yields BN.

56 Claims, No Drawings

POLY(ALKENYLPENTABORANE) CERAMIC PRECURSORS

BACKGROUND OF THE INVENTION

This invention relates to novel poly(alkenylpentaboranes) useful as ceramic precursors, to methods of preparing such poly(alkenylpentaboranes), to methods of preparing ceramics such as boron carbide and boron nitride from such poly(alkenylpentaboranes), and to various objects made from such ceramics.

The production of various carbon products, such as carbon fibers, by pyrolysis of carbon-based polymers is widely practiced. The extension of this technology to prepare ceramics by pyrolysis of organometallic polymers or other precursors is now attracting considerable attention. This interest stems from the importance of ceramic products such as SiC, $Si_3N_4$, $B_4C$ and BN and from the potentially versatile and practical processing of these important ceramics that polymer pyrolysis allows. It is being recognized that a variety of polymers can be made consisting of one or more of several toms such as Si, B and N in addition to, or in lieu of, carbon atoms, and that, using these new polymers, it should be possible to make the ceramic products mentioned above in direct analogy with the polymer pyrolysis for processing of carbon materials. Rice, R. W. *Ceram. Bull.*, 62, 889–892 (1983); Wynne, K. J., Rice, R. W., *Ann. Rev. Mater. Sci.*, 14, 297–334 (1984).

Boron nitride (BN) is an important ceramic material because it has the same structure and bonding as graphite. Due to this similarity, BN has stiffness, strength and ablation characteristics that are comparable to those of graphite. On the other hand, BN, an excellent dielectric material, has a very low dielectric constant and a low dielectric-loss factor in contrast to the high values of these two properties of graphite. BN also has a greater resistance to oxidation than graphite. Thus, BN provides the potential of making an oxidation-resistant body with strengths, stiffnesses, and ablation resistances comparable to those found in graphite.

Boron carbide ($B_4C$) is an equally important and useful ceramic material. Due to its thermal and electrical conductivity properties, boron carbide finds utility as a high temperature thermoelectric material. Wood, C., "Boron Carbides as High Temperature Thermoelectric Materials," presented at AIP Conference Proceedings 140, Albuquerque, NM, 1985. Boron carbide also finds use in applications including abrasion resistors, refractory materials and as a reinforcing agent in composites.

There have been attempts to utilize polymer pyrolyses as low temperature alternatives to the preparation of BN and $B_4C$. For example, mixed $B_4C$—SiC ceramics have been obtained from pyrolysis of poly(carboranesiloxane) polymers (Walker, B. E., Jr., Rice, R. W., Becher, P. F., Bender, B. A., Coblenz, W. S., *Ceram. Bull.* 62, 916–923 (1983)); however, the inventors are unaware of any disclosures relating to synthesis of pure $B_4C$ from polymeric precursors. Ceramic materials rich in boron and nitrogen have been obtained from pyrolysis of appropriate precursors. Inert atmosphere pyrolyses of various borazine derivatives, for example, led to reasonable yields of ceramic materials containing boron and nitrogen, but the materials also contained substantial amounts of carbon. Bender, B. A., Rice, R.w., Spann, J. R., *Ceram. Eng. Sci. Proc.*, 6, 1171-1183 (1985). Oligomerization reactions of substituted borazines with silylamine crosslinking groups have been found to provide useful gel materials which upon pyrolysis form boron nitrogen materials. Narula, C. K., Paine, R. T., and Schaeffer, R., *Mat. Res. Soc. Symp. Proc.*, 73, 383–388 (1986), and Narula, C. K., Scheaffer, R., Paine, R. T., Datye, A., Hammetter, W. F., *J. Am. Chem. Soc.*, 109, 5556–5557 (1987). It has recently been reported that ammonia pyrolysis of decaborane polymers linked by diamine molecules produced crystalline BN of high analytical purity. (Presentation of Rees, W. S., Jr. and Seyferth, D. at the 194th National Meeting of the American Chemical Society, September 1987, Paper INOR 446.) Also, the synthesis of BN from ammonia pyrolysis of soluble polyborazine compounds has been disclosed by Paciorek, K. J. L., Harris, D. H., Schmidt-Krone, W., and Kratzer, R. H., Technical Report No. 4, 1987, Ultrasystems Defense and Space Inc., Irvine, CA.

Despite these known methods for preparing $B_4C$ and BN ceramics by pyrolysis of appropriate precursors, there remains a need for new precursors and improved methods which will provide the ceramics in greater purity and higher yields than heretofore possible and which will offer other advantages over prior art processes. Processible ceramic precursors are greatly desired because they would allow the ceramic to be used in a variety of applications not presently commercially feasible. For example, if a soluble precursor to BN or $B_4C$ were available, thin films of the solubilized precursor could be cast and pyrolyzed to yield thin films of the ceramic material. Similarly, a variety of substrates could be coated with the soluble precursor material by various dipping or spraying techniques to yield, after thermal annealing, a substrate coated with the desired BN or $B_4C$ ceramic material. The soluble precursor might also be used to prepare spun fibers of ceramic material or in preparing a multitude of various ceramic/fiber composites.

It is an object of this invention to provide ceramic precursor polymer materials rich in boron and carbon and/or nitrogen which can be pyrolyzed under mild conditions to yield BN and/or $B_4C$ ceramics in high purity and high yields. It is a further object of this invention to provide such ceramic precursors which are processible. These and other objects will be made clear from the following summary and discussion of this invention.

SUMMARY OF THE INVENTION

This invention relates to novel ceramic precursors which comprise condensation products of alkenylpentaboranes. The term "ceramic precursor" as used herein is intended to encompass monomers, oligomers or polymers which can be pyrolyzed to yield ceramic materials. The novel ceramic precursors can be substantially non-crosslinked, in which case they are soluble and easily processible, or they may be crosslinked. They include ceramic precursors to both $B_4C$ and B-Group V materials such as BN, BP and BAs.

This invention further relates to processes for preparing the novel ceramic precursors of this invention, and to processes for converting those precursors to ceramic materials. Still further, this invention relates to articles such as ceramic films and ceramic coated substrates made using the novel ceramic precursors of this invention.

DETAILED DESCRIPTION OF THE INVENTION

A. Novel poly(alkenylpentaboranes)

The novel ceramic precursors of this invention are condensation products of alkenylpentaboranes. The alkenylpentaboranes are pentaboranes mono-substituted with an alkenyl group, generally of two to six carbon atoms and preferably of two to four carbon atoms, and may be prepared by methods known in the art. For example, it has been disclosed that complexes such as $Ir(CO)Cl[P(C_6H_5)_3]_2$ and $(RC_2R')Co_2(CO)_6$ catalyze the reaction of pentaborane(9) with alkynes such as acetylene under mild conditions giving good yields of alkenylpentaboranes. Sneddon, L. G., *Pure & Appl. Chem.*, Vol. 59, No. 7, 837–846 (1987). It has also been reported that high yields of alkenylpentaboranes can be obtained by catalyzing the reaction of pentaborane(9) and acetylene with the complex $[Cp*IrCl_2]_2$ in the presence of proton sponge. Mirabelli, M. G. L., Sneddon, L. G., *J. Am. Chem. Soc.*, 110, 449–453 (1988).

Soluble ceramic precursors are prepared from the alkenylpentaboranes by heating them under conditions effective to induce condensation of the alkenylpentaboranes but not to induce crosslinking. The reaction is best carried out under a vacuum or in an inert gas atmosphere and, preferably, the material is heated at a temperature in the range of about 125° to 140° C. for a period of about two to five hours. The resulting poly(alkenylpentaboranes) comprise repeating units of the formula

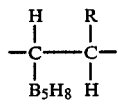

where R is H or an alkyl group. Since a ceramic material with a high B/C ratio will usually be desired, R will preferably be H or a $C_1$–$C_2$ alkyl group; however R may be a higher alkyl, for example up to four carbon atoms.

The liquid alkenylpentaboranes will generally be converted to poly(alkenylpentaboranes) by heating an stirring them, neat, under a vacuum. It should also be possible, however, to condense the alkenylpentaboranes by depositing them, e.g., by chemical vapor deposition, on an activated surface. An activated surface would be a surface heated to a temperature effective to induce polymerization of the alkenylpentaboranes and/or treated with catalytic agents known to induce such polymerizations. In such a method, the alkenylpentaboranes would polymerize on the surface of the substrate, creating a polymer coating on the substrate. The polymer coated substrate would then be further treated as described hereinafter to yield a ceramic coated substrate.

The non-crosslinked poly(alkenylpentaboranes) prepared in this manner are soluble in common organic solvents such as benzene, toluene and tetrahydrofuran which are inert toward pentaborane. The term "substantially non-crosslinked" as used in this application, is intended to encompass those poly(alkenylpentaboranes) which are soluble (i.e., >1.0 wt. %, but generally at least about 50 wt. %) in the above-mentioned inert organic solvents. The advantages of a soluble ceramic precursor have already been discussed. By virtue of the processibility of the soluble precursor, the final ceramic material may be used in a variety of applications, such as thin films and coatings, not practically available using prior art precursors and methods.

B. B4C Precursors

Different treatments of the non-crosslinked poly(alkenylpentaboranes) are used to prepare either $B_4C$ or BN ceramics. To maximize the yield of $B_4C$, further heat-treatment of the non-crosslinked poly(alkenylpentaborane) to induce crosslinking is required. It is important to cross-link the poly(alkenylpentaboranes) prior to pyrolysis as linear polymers are known to give lower ceramic yields. To induce crosslinking of the poly(alkenylpentaboranes), they are generally heated under conditions effective to result in the loss of approximately 1.0 mol equivalent of $H_2$:

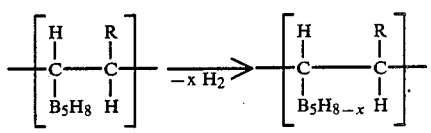

Typically, the alkenylpentaboranes are heated at temperatures in the range of 130° to 150° C. over a period of three to five hours; however, it is recognized that shorter periods and higher temperatures, or longer periods and lower temperatures, could also be used. Alternatively, the cross-linked poly(alkenylpentaboranes) may be prepared directly, without the isolation of a non-crosslinked intermediate, from the alkenylpentaboranes by heating them at a temperature of at least about 140° C. for a period of at least about eight hours.

The crosslinked poly(alkenylpentaboranes) are hard and intractable materials which are insoluble in common inert organic solvents. For the purposes of this invention, the term "substantially crosslinked" is intended to encompass those polymers which are not soluble (i.e., <1 wt. %) in solvents such as benzene, toluene and THF.

Pyrolysis of the crosslinked poly(alkenylpentaboranes) by methods known in the art leads to the desired $B_4C$ materials. Amorphous $B_4C$ can be obtained by heating the precursor materials to a temperature in the range of about 600° to 1000° C.; to obtain crystalline $B_4C$, the materials must be heated to higher temperatures, e.g., about 1700° C. Alternatively, $B_4C$ may be generated directly from the non-crosslinked poly(alkenylpentaborane) by subjecting the non-crosslinked polymer to pyrolysis conditions, e.g., slow heating (about 10° C./minute) from room temperature to about 1000° C.

C. BN Precursors

To convert the non-crosslinked poly(alkenylpentaboranes) to BN, BP or BAs ceramic materials, the non-crosslinked materials are first heated in the presence of ammonia, phosphine or arsine under conditions effective to allow reaction with approximately five mole equivalents of either the nitrogen, phosphorus or arsine. The reaction, and its product, illustrated for the BN precursor, are believed to be as follows:

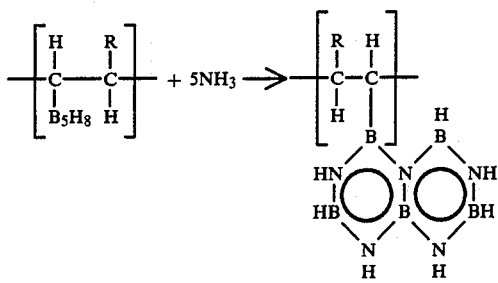

where R=H or alkyl.

Excellent results have been obtained by heating the poly(alkyenylpentaborane) under ammonia to a temperature of about 350° C. over a period of three to five hours, but it is recognized that use of different heating rates and temperatures would be within the skill of one in the art. It is important to heat the material slowly to insure takeup of the maximum amount of ammonia. The resulting material is a brittle solid which is insoluble in common organic solvents.

Pyrolysis of the above-described ceramic precursor by methods known in the art leads to the desired BN, BP or BAs materials. Pyrolysis must be performed under ammonia, in the case of BN, or under phosphine or arsine in the case of BP or BAs. As with the previously described $B_4C$ materials, amorphous BN can be obtained by heating the precursor materials to a temperature in the range of about 600° to 1000° C.; to obtain crystalline BN, the materials must be heated to higher temperatures, e.g., about 1700° C. Alternatively, BN may be generated directly from the non-crosslinked poly(alkenylpentaborane) by subjecting the non-crosslinked polymer to pyrolysis conditions under ammonia, e.g., slow heating (about 10° C./minute) from room temperature to about 1000° C.

D. Applications

Myriad uses exist for the ceramic materials made according to this invention. They may be used, for example, to prepare refractory materials, fibers and composites. By virtue of the processibility of the poly-(alkenylpentaborane) precursors disclosed herein, the ceramic materials may be utilized in other applications not heretofore practical. For example, thin BN or $B_4C$ films may be made by casting thin films of the non-crosslinked polymer precursor, treating the precursor as described herein to crosslink it or to incorporate nitrogen, and then pyrolyzing the film. In a similar manner, substrates such as but not limited to fibers and silicon chips, may be coated with BN or $B_4C$ by coating the substrate with non-crosslinked polymer precursor, treating the coated substrate to crosslink the polymer or to incorporate nitrogen, and then subjecting the coated substrate to pyrolysis conditions. In both applications, the availability of a soluble ceramic precursor allows for preparation of the ceramic article under milder conditions than those required by the chemical vapor deposition methods which must be used with less processible precursors.

Although this description has focused on the preparation of $B_4C$ and BN ceramic materials via soluble polymer precursors, it is also possible to prepare such materials directly, without isolation of intermediates, from the alkenylpentaborane starting materials such as 2-vinylpentaborane. Under suitable conditions which could be easily determined by one skilled in the art, the alkenylpentaboranes could be pyrolyzed to $B_4C$ or BN (or BP or BAs). For example, the alkenylpentaborane could be applied to a substrate surface by chemical vapor deposition and exposed to pyrolyzing conditions to effect pyrolysis to the ceramic material.

The compositions and methods of this invention are illustrated in the following examples which are not intended to be limiting in scope.

EXAMPLE 1—PREPARATION OF POLY(2-VINYLPENTABORANE)

A neat solution of 2-vinylpentaborane was stirred under vacuum at 125° C. for several hours. As the reaction progressed, the solution became increasingly viscous until the magnetic stirbar would no longer move. At this point, the flask containing the solution was frozen to −196° C., and trace amounts of non-condensable gas were removed. The flask was then warmed to room temperature, and the volatile materials were removed in vacuo, leaving an air-sensitive, viscous liquid identified as poly-[2-(vinyl)pentaborane in approximately 91% yield.

Poly[2-(vinyl)pentaborane]: $^{11}B$ NMR (64.2 MHz, ppm, $C_6D_6$): 3.2(s,1), −14.6(d,2), −19.2(d,1), −52 4(d,1). $^1H$ NMR (200 MHz, δ, $C_6D_6$): 1.11(m,3), −1.8(br,2), −2.61 (br,2). IR(NaCl plates): 2940(s), 2900(vs), 2860(vs), 2820(s), 2590(vs), 1820(s,br), 1400(s), 1150(s), 1020(s), 880(s), 840(s), 790(m), 710(m), 640(s), 600(s), cm$^{-1}$.

This oligomer was soluble in common organic solvents such as benzene, toluene and THF, and had a broad weight range with fractions up to a molecular weight of about 1000 g/mol (GPC). (Molecular weights obtained by gel permeation chromatography were determined by comparison to poly(ethylene glycol)-/poly(propylene glycol) standards.) The $^{11}B$ NMR spectrum of the oligomer was similar to that of the starting monomer consisting of a low field singlet of intensity 1, attributed to the substituted boron B2, and three doublets with relative intensities of 2:1:1 corresponding to B3,5, B4, and B1, respectively. Upon polymerization, the singlet resonance at −0.7 ppm (monomer) was replaced by a new resonance at +3.2 ppm. This is consistent with the formation of a saturated polymer backbone since the shift of this resonance is similar to that of the substituted boron in 2-(ethyl)pentaborane. (Dunks, G. B., Searcy, I. W., Spielman, J., Inorg. Chem., 6, 1465–1471 (1967)) The $^1H$ NMR is also consistent with the formation of an oligomer showing several broad aliphatic proton resonances in the region 1-2 ppm and no vinylic proton resonances at 5-6 ppm. The infrared spectrum shows aliphatic C—H stretches from 2940-2820 cm$^{-1}$, a characteristic B—H stretch at 2590 cm$^{-1}$, and, most importantly, no evidence for a C=C absorbance.

Soluble polymers derived from 2-(trans-1-propenyl)-$B_5H_8$ and 2-(trans-1-butenyl)-$B_5H_8$ were prepared in an analogous fashion.

Poly[2-(1-butenyl)pentaborane]: $B^{11}$ NMR (64.2 MHz, ppm, $C_6D_6$): 3.5(s,1); −14.1(d,2); −18.6(d,1); −52.5(d,2); $^1H$ NMR (200 MHz, δ, $C_6D_6$): 1.63(br m,2); 0.95(m,3), −160(br m,2); −2.51(br m,2). IR(NaCl): 2950(s); 2920(s); 2860(s); 2590(vs); 1815(w); 1500(w); 1380(s, Vbr); 1225(m); 1180(m); 1080(m); 1015(m); 980(w); 890(s); 840(w); 795(w); 730(m); 640(m), cm$^{-1}$.

EXAMPLE 2—PREPARATION OF CROSSLINKED POLY(2-VINYLPENTABORANE)

Poly(2-vinylpentaborane) prepared according to Example 1 was heated at 140° C. for three to five hours, resulting in the loss of approximately 1.0 mol equivalent of $H_2$ and production of a hard, intractable, crosslinked polymer. The polymer was insoluble in acetone, benzene or THF and decomposed in more polar solvents such as DMF and DMSO.

Elemental analysis: Found C, 27.76; H, 10.16; B,60.46; Anal. Calcd for $C_2B_5H_9$ C, 27.59; H, 10.34; B,62.07.

Thermogravimetric analysis of the crosslinked polymer showed a sharp weight loss in the range of 220°–375° C. (15%) and a more gradual weight loss (3%) in the region 400°–800° C. Differential scanning calorimetry performed on the crosslinked polymer exhibited a mild exotherm at 100° C., attributed to residual crosslinking, and, consistent with the TGA results, a large pyrolytic exotherm in the range 200°–350° C.

Crosslinked polymers derived from 2-(trans-1-propenyl)-$B_5H_8$ and 2-(trans-1-butenyl)-$B_5H_8$ were prepared in an analogous fashion. Elemental analysis for crosslinked poly[2-(1-butenyl)pentaborane]: Found B, 46.06; C, 36.60; H, 11.48; Anal. Calcd for $C_4B_5H_{14}$ B, 46.54; C, 41.40, H, 12.06.

EXAMPLE 3—PREPARATION OF $B_4C$

Bulk pyrolysis was performed by heating a sample of the crosslinked polymer prepared in Example 2 in a platinum boat in a tube furnace under a flow of argon gas. The sample was heated at approximately 10° C./minute until a maxiumum temperature of 1000° C. was achieved, whereupon heating was continued at that temperature for an additional 6.5 hours. $B_4C$ was obtained in 77.0% ceramic yield (97.1% of a theoretical yield of 79.3%). Elemental analysis of product: Anal calcd for $B_4C$ C, 21.74; B, 78.26; Found C, 21.37; B, 77.26; H, 0.21; N, 0.014; 0, 0.3.

The material had a black, shiny appearance and retained some of its shape and structural integrity. There were no sharp lines in the X-ray diffraction pattern suggesting a completely amorphous structure. Elemental analysis of the ceramic indicated a B/C ratio of 4.02 with measured levels of hydrogen, nitrogen and oxygen well below 0.5%. The density of the material was found to be 2.0 g/mL (observed density for hot pressed $B_4C$ 2.5 g/mL) and compares favorably with the density of $B_4C$ (1.6–1.8 g/mL) prepared from the pyrolysis of poly(carboranesiloxanes) (Walker, B. E., et al., supra.).

EXAMPLE 4—PREPARATION OF BN PRECURSOR

A sample of the non-crosslinked poly(2-vinylpentaborane) prepared as in Example 1 was placed in a tube furnace under a flow of ammonia gas (approx. 100 ml/min). The sample was initially heated to 75° C. and then slowly heated (2° C./min) through the temperature range 75°–350° C. A white brittle material was produced under these conditions which was insoluble in common organic solvents.

Elemental analysis of product: B, 33.15; N, 41.03; C, 14.70; H, 4.93. IR (Diffuse): 3420 vs, 3200 s, 2940 s, 2900 s, 2860 s, 2500 m, 1600 m, 1400 s, 1110 m, 700 m, 610 m, $cm^{-1}$.

The diffuse reflectance IR spectrum reveals the presence of N—H, C—H, B—H and B—N bonds while elemental analysis is consistent with an empirical formula of $C_2B_5N_5H_{8.4}$. UV-Visible spectrum shows a broad absorption reaching into the high energy UV range ( 200 nm) confirming the presence of a $\pi-\pi^*$ electronic transition. According to the microanalytical data, the B/C ratio in this material is identical to that of the polymeric starting polymer, suggesting that the polymeric vinyl backbone has remained intact. The $\pi-\pi^*$ transition evident in the product, coupled with a B/N ratio of 1.0, indicates the presence of delocalized borazine rings and, indeed, the UV spectrum described is similar to spectra reported for fused borazine polymers prepared from the photolysis of borazine. (Neiss, M. A., Porter, R. F., *J. Am. Chem. Soc.*, 94, 1438–1443 (1972); Shindo, K., Lipsky, S., *J. Chem. Phys.*, 45 2292–2297 (1966).)

EXAMPLE 5—PREPARATION OF BN

A sample of the precursor prepared in Example 4 was heated under ammonia for two hours at 1000° C., resulting in the formation of a light yellow, completely amorphous compound identified as BN in a chemical yield of 76.2%.

Elemental analysis: Anal. Calcd for BN B, 43.55; N, 56.45; Found B, 45.24; N 55.88; C, 0.81; H, 0.46.

IR (Diffuse): 3640 m, 3420 s, 2800 w, 2560 m, 2320 w, 1440 vs vbr, 1100 s, 940 w, 800 vs, 680 s, 620 s, $cm^{-1}$.

Elemental analysis of the product shows a B/N ratio of 1.05 with measured levels of carbon of 0.81%. Diffuse reflectance IR is consistent with spectra previously reported for BN. (Brame, E. G., Jr., Margrave, J. L., Meloche, V. W., *J. Inorg. Nucl. Chem.*, 5, 48–52 (1957); Takahashi, T., Itoh, H., Takeuchi, A., *J. Crystal Growth*, 47, 245–250 (1979).) Other pyrolyses were perfomed where the intermediate compound was not isolated. In all cases, the ceramics obtained after pyrolysis were identical to those described above, although the ceramic yields were slightly lower (70–72%).

What is claimed is:

1. Ceramic precursors comprising condensation products of alkenylpentaboranes.

2. The ceramic precursors of claim 1 in which said alkenyl group is selected from the group consisting of vinyl, propenyl and butenyl.

3. The ceramic precursors of claim 2 in which said alkenylpentaborane is 2-(vinyl)pentaborane.

4. Ceramic precursors of claim 1 having repeating units of the formula

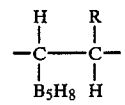

where R=H or $C_1$-$C_4$ alkyl.

5. The ceramic precursors of claim 1 which are substantially non-crosslinked.

6. The ceramic precursors of claim 4 which are substantially non-crosslinked.

7. The ceramic precursors of claim 1 which are substantially crosslinked.

8. The ceramic precursors of claim 4 which are substantially crosslinked.

9. Ceramic precursors of claim 1 having repeating units of the formula

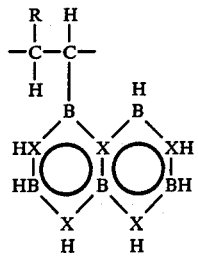

where R=H and C₁-C₄ alkyl, and X=N, P or As.

10. The ceramic precursors of claim 9 in which X=N and R=H, CH₃ or C₂H₅.

11. A process for preparing substantially non-crosslinked ceramic precursors comprising heating an alkenylpentaborane under conditions effective to induce condensation of the alkenylpentaborane but not to induce crosslinking of said ceramic precursors.

12. The process of claim 11 in which said heating is carried out under a vacuum or in an inert gas atmosphere.

13. The process of claim 11 in which said alkenylpentaborane is heated under a vacuum to a temperature in the range of about 125° to 140° C. for about two to three hours.

14. A process for preparing substantially crosslinked ceramic precursors comprising heating the product of claim 11 under an alkenylpentaborane under conditions effective to induce cross-linking of said product.

15. The process of claim 14 in which said heating is carried out under a vacuum or in an inert gas atmosphere.

16. The process of claim 14 in which said alkenylpentaborane is heated under a vacuum at a temperature in the range of at least about 130°-150° C. for about a period of about three to five hours.

17. A process for preparing BX ceramic precursors, where X=N, P or As, comprising heating a ceramic precursor of claim 5 in the presence of XH₃ under conditions effective to allow for reaction of about five mole equivalents XH₃.

18. The process of claim 17 where X=N and said ceramic precursor of claim 5 is heated in the presence of ammonia up to a temperature of about 350° C. over a period of at least about three hours.

19. A process for preparing ceramic precursors having repeating units of the formula

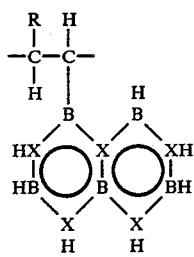

where R=H or C₁-C₄ alkyl, and X=N, P or As, comprising heating a ceramic precursor of claim 6 in the presence of XH₃ under conditions effective to allow for reaction of about five mole equivalents XH₃.

20. The process of claim 19 where X=N.
21. The product of claim 11.
22. The product of claim 12.
23. The product of claim 13.
24. The product of claim 14.
25. The product of claim 15.
26. The product of claim 16.
27. The product of claim 17.
28. The product of claim 18.
29. The product of claim 19.
30. The product of claim 20.

31. A process for preparing B₄C comprising pyrolyzing a ceramic precursor of claim 1.

32. A process for preparing B₄C comprising pyrolyzing a ceramic precursor of claim 5.

33. A process for preparing B₄C comprising pyrolyzing a ceramic precursor of claim 6.

34. A process for preparing B₄C comprising pyrolyzing a ceramic precursor of claim 7.

35. A process for preparing B₄C comprising pyrolyzing a ceramic precursor of claim 8.

36. A process for preparing BX where X=N, P or As, comprising pyrolyzing a ceramic precursor of claim 1 under XH₃.

37. A process for preparing BX where X=N, P or As, comprising pyrolyzing a ceramic precursor of claim 5 under XH₃.

38. A process for preparing BX where X=N, P or As, comprising pyrolyzing a ceramic precursor of claim 6 under XH₃.

39. A process for preparing BX where X=N, P or As, comprising pyrolyzing the product of claim 17 under XH₃.

40. A process for preparing BN comprising pyrolyzing the product of claim 18 under NH₃.

41. A process for preparing BX where X=N, P or As, comprising pyrolyzing the product of claim 19 under XH₃.

42. A process for preparing BN comprising pyrolyzing the product of claim 20 under NH₃.

43. A process for preparing B₄C comprising pyrolyzing alkylpentaborane.

44. The process of claim 43 in which said alkenylpentaborane is 2-(vinyl)pentaborane.

45. A process for preparing BX where x=N, P or As, comprising pyrolizing an alkenylpentaborane under XH₃.

46. The process of claim 45 in which said alkenylpentaborane is 2-(vinyl)pentaborane and X=N.

47. A process for preparing a film of B₄C comprising casting a film of a substantially non-crosslinked condensation product of an alkenylpentaborane, treating said film to induce crosslinking of said condensation product, and pyrolyzing said film.

48. The process of claim 47 said substantially non-crosslinked condensation product comprises repeating units of the formula

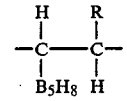

where R=H or C₁-C₄ alkyl.

49. The process of claim 48 where said substantially non-crosslinked condensation product is poly-2-vinylpentaborane.

50. A process for preparing a film of BX where X=N, P or As, comprising casting a film of a substantially non-crosslinked condensation product of an alkenylpentaborane, heating said film under $XH_3$ to effect reaction of said condensation product with about five molar equivalents of X, and pyrolyzing said film.

51. The process of claim 50 where $X=N$.

52. A process for preparing a substrate coated with $B_4C$ comprising coating said substrate with a substantially non-crosslinked condensation product of an alkenylpentaborane, treating said coated substrate to induce crosslinking of said condensation product, and subjecting said coated substrate to pyrolysis.

53. The process of claim 52 where said substantially non-crosslinked condensation product comprises repeating units of the formula

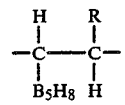

where $R=H$ or $C_1-C_4$ alkyl.

54. The process of claim 53 where said substantially non-crosslinked condensation product is poly-2-vinylpentaborane.

55. A process for preparing a substrate coated with BX where $X=N$, P or As, comprising coating said substrate with a substantially non-crosslinked condensation product of an alkenylpentaborane, heating said coated substrate under $XH_3$ to effect reaction of said condensation product with about five molar equivalents of X, and subjecting said coated substrate to pyrolysis.

56. The process of claim 55 where $X=N$.

* * * * *